(12) United States Patent
Noh et al.

(10) Patent No.: US 8,457,101 B2
(45) Date of Patent: Jun. 4, 2013

(54) METHOD FOR TRANSMITTING PREAMBLE IN SCALABLE BANDWIDTH SYSTEM

(75) Inventors: Min Seok Noh, Gyeonggi-do (KR); Yeong Hyeon Kwon, Gyeonggi-do (KR); Jin Sam Kwak, Gyeonggi-do (KR); Dong Cheol Kim, Gyeonggi-do (KR); Sung Ho Moon, Gyeonggi-do (KR); Seung Hee Han, Gyeonggi-do (KR); Hyun Woo Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1160 days.

(21) Appl. No.: 12/348,130

(22) Filed: Jan. 2, 2009

(65) Prior Publication Data

US 2009/0225824 A1  Sep. 10, 2009

Related U.S. Application Data

(60) Provisional application No. 61/018,672, filed on Jan. 3, 2008.

(30) Foreign Application Priority Data

Mar. 11, 2008 (KR) ........................ 10-2008-0022476

(51) Int. Cl.
  *H04J 3/06* (2006.01)
(52) U.S. Cl.
  USPC ............ 370/350; 370/203; 370/208; 375/260
(58) Field of Classification Search
  USPC ................ 370/208, 203, 350, 330, 310, 343, 370/338, 336; 375/260, 362, 267; 455/434, 455/68
  See application file for complete search history.

(56) References Cited

U.S. PATENT DOCUMENTS

| 6,034,988 | A | * | 3/2000 | VanderMey et al. | 375/134 |
| 7,929,624 | B2 | * | 4/2011 | Lindoff et al. | 375/260 |
| 2005/0243940 | A1 | * | 11/2005 | Huh et al. | 375/260 |
| 2006/0153282 | A1 | | 7/2006 | Jung et al. | 375/146 |
| 2007/0230590 | A1 | * | 10/2007 | Choi et al. | 375/260 |
| 2007/0230591 | A1 | * | 10/2007 | Choi et al. | 375/260 |
| 2008/0069034 | A1 | * | 3/2008 | Buddhikot et al. | 370/328 |
| 2008/0069080 | A1 | * | 3/2008 | Joung et al. | 370/350 |
| 2008/0080463 | A1 | * | 4/2008 | Stewart et al. | 370/342 |
| 2008/0095195 | A1 | * | 4/2008 | Ahmadi et al. | 370/478 |

(Continued)

FOREIGN PATENT DOCUMENTS

| EP | 1049302 | 11/2000 |
| EP | 1524813 | 4/2005 |
| WO | 03005159 | 1/2003 |

*Primary Examiner* — Abdullah Riyami
(74) *Attorney, Agent, or Firm* — Lee, Hong, Degerman, Kang & Waimey

(57) ABSTRACT

A method for transmitting a preamble in a scalable bandwidth system is disclosed. The method includes transmitting a primary synchronization channel to which symbols are allocated at intervals of two or more subcarriers, through a specific bandwidth out of an entire system bandwidth at a start time point of a synchronization period, and transmitting a secondary synchronization channel through the specific bandwidth with a prescribed time difference from the primary synchronization channel at the synchronization period. A mobile station can use the same search routine irrespective of a system bandwidth, does not experience any difficulty at a cell edge in establishing signal timing synchronization, can simply perform preamble search, and can transmit a signal in a maximum usable bandwidth, thereby improving the accuracy of location measurement.

7 Claims, 6 Drawing Sheets

Subcarrier index

U.S. PATENT DOCUMENTS

| | | | |
|---|---|---|---|
| 2008/0117887 A1* | 5/2008 | Joung et al. | 370/338 |
| 2008/0181174 A1* | 7/2008 | Cho | 370/329 |
| 2009/0086669 A1* | 4/2009 | McCoy et al. | 370/329 |
| 2009/0086832 A1* | 4/2009 | Tarokh et al. | 375/260 |
| 2009/0131098 A1* | 5/2009 | Khandekar et al. | 455/525 |
| 2009/0274112 A1* | 11/2009 | Ma et al. | 370/330 |
| 2009/0323642 A1* | 12/2009 | Tanno et al. | 370/336 |
| 2010/0034301 A1* | 2/2010 | Chang et al. | 375/260 |
| 2010/0067500 A1* | 3/2010 | Kim et al. | 370/336 |
| 2011/0002430 A1* | 1/2011 | Kim et al. | 375/362 |

* cited by examiner

METHOD FOR TRANSMITTING PREAMBLE IN SCALABLE BANDWIDTH SYSTEM

CROSS-REFERENCE TO RELATED APPLICATIONS

Pursuant to 35 U.S.C. §119(a), this application claims the benefit of earlier filing date and right of priority to Korean Application No. 10-2008-0022476, filed on Mar. 11, 2008, and pursuant to 35 U.S.C. §119(e), also claims the benefit of U.S. Provisional Application Ser. No. 61/018,672, filed on Jan. 3, 2008.

TECHNICAL FIELD

The present invention relates to a scalable bandwidth system, and more particularly, to a preamble transmission method which enables a mobile station to easily perform preamble search by designing the preamble considering a scalable bandwidth and can extend a reference signal for location measurement.

BACKGROUND ART

With globalization of an application market of wireless communication systems, a variety of specifications have been demanded according to communication bandwidths proposed by each country. In recently established standards, a 3GPP LTE, IEEE 802.16, or IEEE 802.22 system determines specification such that standard air interface can be operated according to radio frequency environments of each country. Especially, under the condition that the systems should be operated over various frequency bandwidths, a scalable bandwidth is required for a basic control channel in the system. To detect a system synchronization signal and basic system information that are searched by a mobile station to access the system, the mobile station should be operated under various assumptions. Namely, if no consistent signal specification exists for one radio communication interface, the mobile station should attempt to perform reception and decoding for all combinations. This increases complexity of the mobile station. A 3GPP LTE system is designed such that the mobile station initially decodes system information in a minimum bandwidth. The 3GPP LTE system is designed to be operated in a minimum bandwidth of 1.25 MHz or 1.4 MHz. A channel search and decoding parts causing the complexity of the mobile station, that is, a synchronization channel and a primary broadcasting channel are designed to be suitable for the minimum system bandwidth. The mobile station performs search only in the minimum bandwidth. Even though the 3GPP LTE system uses any bandwidth within an entire 3GPP LTE bandwidth, since the search process is performed only for the minimum system bandwidth, development costs for the mobile station and complexity of the mobile station are reduced.

Such requirements are also necessary for IEEE 802.16m. In a current legacy system, a system bandwidth is fixed at 10 MHz. IEEE 802.16m, which improves a legacy system of IEEE 802.16, defines 5 MHz to 20 MHz or more as a basic system bandwidth and is required to support the legacy system.

Since a minimum value of the system bandwidth in IEEE 802.16m is 5 MHz or less, the system should be designed so as to operate in such a minimum bandwidth. If a wider bandwidth should be supported, a structure which can easily be extended to support a broader bandwidth is necessary. Furthermore, a legacy support at 10 MHz should be considered.

FIG. 1 illustrates an example of a synchronization channel structure of a 3GPP LTE system.

A synchronization channel (SCH) used in the 3GPP LTE system sets a primary SCH (P-SCH) and a secondary SCH (S-SCH) in a minimum bandwidth at regular intervals within a radio frame. The P-SCH is carried on orthogonal frequency-division multiplexing (OFDM) at intervals of two subcarriers and transmitted. The S-SCH is constructed in an overlap format of two short codes set at intervals of two subcarriers. One of the two short codes is shifted by one subcarrier. To discriminate a start location from a radio frame, the first S-SCH and the second S-SCH have different structures.

FIG. 2 illustrates an example of a synchronization channel structure of an IEEE 802.16 system.

In an IEEE 802.16e (WiMAX) system, a preamble for a SCH is designed to occupy an entire system bandwidth. Preamble sequences are inserted at intervals of three OFDM subcarriers. Here, a preamble for a SCH is denoted by 'SCH' for unitary.

In FIG. 2, since offset can be assigned as 0, 1, and 2, three discernible codes may be transmitted. The offset is actually associated with a sector. When system bandwidth varies, the preamble sequences are separately defined to be suitable for the bandwidth. In the 3GPP LTE, SCHs are generated twice within one wireless frame. The SCHs are set at intervals of 5 ms, whereas a preamble of the IEEE 802.16e (WiMAX) is transmitted in units of a 5 ms frame. Accordingly, the preamble is transmitted at a rate as in the 3GPP LTE.

IEEE 802.16m is designed to be an improved version of IEEE 802.16e and has been developed to satisfy IMT-Advance performance requirements. However, the current IEEE 802.16e can not efficiently support a scalable bandwidth and has a disadvantage in detecting a system signal by the mobile station. The preamble sequence of IEEE 802.16e is constructed at three unit intervals but uses different subcarrier offset locations per sector. If signals according to sectors are overlapped, repeated features of the preamble are eliminated. Then repeated patterns at a cell edge in the time domain can not be discerned.

Consequently, in an air interface specification of the current IEEE 802.16e, the mobile station should perform preamble search corresponding to an entire system bandwidth and cannot efficiently perform sequence search at a cell edge.

DISCLOSURE

Technical Problem

An object of the present invention devised to solve the problem lies in providing a preamble transmission method which allows a mobile station to efficiently perform preamble search by designing a preamble considering a scalable bandwidth, extends a reference signal for location acquisition, and can improve the accuracy of location measurement.

Technical Solution

The object of the present invention can be achieved by providing a method for transmitting a preamble, including transmitting a P-SCH to which symbols are allocated at intervals of two or more subcarriers, through a specific bandwidth out of an entire system bandwidth at a start time point of a synchronization period, and transmitting a S-SCH through the specific bandwidth with a prescribed time difference from the P-SCH at the synchronization period.

Symbols may be allocated to the S-SCH at intervals of two or more subcarriers and pilot symbols may be arranged between the allocated symbols.

The prescribed time difference may be a time interval corresponding to ¼, ½ or ¾ of the synchronization period.

The P-SCH or the S-SCH may be arranged on OFDM symbols which are adjacent just before or after the P-SCH or the S-SCH.

In another aspect of the present invention, provided herein is a method for transmitting a preamble, including transmitting a P-SCH to which symbols are allocated at intervals of two or more subcarriers, through a specific bandwidth out of an entire system bandwidth at a start time point of a synchronization period, and transmitting a S-SCH through a bandwidth having different size from the specific bandwidth with a prescribed time difference from the P-SCH at the synchronization period.

The S-SCH may be transmitted through a bandwidth except for the specific bandwidth out of the entire system bandwidth.

The S-SCH may be transmitted through a part of a bandwidth except for the specific bandwidth out of the entire system bandwidth or through the bandwidth except for the specific bandwidth out of the entire system bandwidth.

An extended synchronization channel, to which cyclic copy of the S-SCH is applied, may be (simultaneously) transmitted through the specific bandwidth.

If the extended synchronization channel is larger than the S-SCH, the transmission of the extended synchronization channel repeatedly may transmit the S-SCH through the extended synchronization channel.

Symbols may be allocated to the S-SCH at intervals of two or more subcarriers and pilot symbols may be arranged between the allocated symbols.

The prescribed time difference may be a time interval corresponding to $1/4$, $1/2$ or $3/4$ of the synchronization period.

In a further aspect of the present invention, provided herein is a method for transmitting a preamble, including transmitting a P-SCH to which symbols are allocated at intervals of two or more subcarriers through a specific bandwidth out of an entire system bandwidth at a start time point of a synchronization period, and transmitting a S-SCH through a bandwidth except for the specific bandwidth, and retransmitting the primary and S-SCHs with a prescribed time difference therebetween at the synchronization period.

The S-SCH may be transmitted through a part of a bandwidth except for the specific bandwidth out of the entire system bandwidth or through the bandwidth except for the specific bandwidth out of the entire system bandwidth.

The prescribed time difference may be a time interval corresponding to $1/4$, $1/2$ or $3/4$ of the synchronization period.

In another aspect of the present invention, provided herein is a method for transmitting a preamble, including transmitting a P-SCH, and a first S-SCH for discriminating a start location of a frame, using preamble OFDM symbols split into two by adjusting a subcarrier interval through a specific bandwidth out of an entire system bandwidth at a start time point of a synchronization period, and transmitting the P-SCH and a second S-SCH using the preamble OFDM symbols split into two through the specific bandwidth with a prescribed time difference at the synchronization period, wherein the first S-SCH and the second S-SCH have different structures.

Symbols may be allocated to the P-SCH and S-SCHs at intervals of two or more subcarriers.

Pilot symbols may be arranged between the symbols allocated to the S-SCHs.

Advantageous Effects

According to the embodiments of the present invention, a mobile station can use the same search routine irrespective of a system bandwidth and does not experience any difficulty at a cell edge in establishing signal timing synchronization. Furthermore, the mobile station can simply perform preamble search and can transmit a signal in a maximum usable bandwidth, thereby improving the accuracy of location measurement.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the exemplary embodiments of the present invention, examples of which are illustrated in the accompanying drawings. However, the exemplary embodiments of the present invention may be modified to other forms and the scope of the present invention should not be limited to the description of the embodiments.

In IEEE 802.16m, a preamble may be used for three purposes, namely, timing synchronization for detecting downlink signal synchronization of a basic system, cell identifier (ID) information for discriminating a system signal, and location measurement for measuring location of a mobile station. To support these usages, signal requirements may be defined as follows.

A mobile station should detect specific signal patterns and the number of the signal patterns should be minimized to reduce search complexity. If a reception signal has a feature for enabling the mobile station to perform a detection operation, e.g., if the signal has a repeated feature, it is easy to detect timing irrespective of a channel status of a signal. A structure of the signal pattern should have a form such that the mobile station can detect timing with minimum costs, namely, with a minimum chip area and minimum power consumption.

If timing detection has been completed, the mobile station should be ready to detect a cell ID. The cell ID is the most fundamental seed value indicating a signal structure of a system. Therefore, cells within a range where a signal is transmitted should use different IDs. When considering a femtocell, a large number of cell IDs is required. During transmission of cell IDs, a measure to reduce an error probability of the cell IDs should be considered. Especially, degradation caused by a channel should be prevented. And, the more cell IDs are used, the more combinations should detected by the mobile station. Thus, a cell indication method to help detection of the cell IDs is necessary.

Location measurement is a proper method used for a synchronous system. In the synchronous system, all cells have the same signal transmission timing through a global positioning system (GPS) clock, etc. Accordingly, if the mobile station is able to measure signals transmitted at the same time, the mobile station can calculate location thereof through trigonometric measurement. To measure a signal of a base station in another cell, the mobile station may desirably use a signal pattern specific to that cell and at the same time a known signal pattern. Namely, a preamble signal may be used. However, since the accuracy of timing measurement is determined by a sampling rate of a signal, a transmission signal of a bandwidth as broad as possible is required.

Hereinafter, a signal structure of a preamble considering the above conditions will be described through a few exemplary embodiments.

Figure 1:
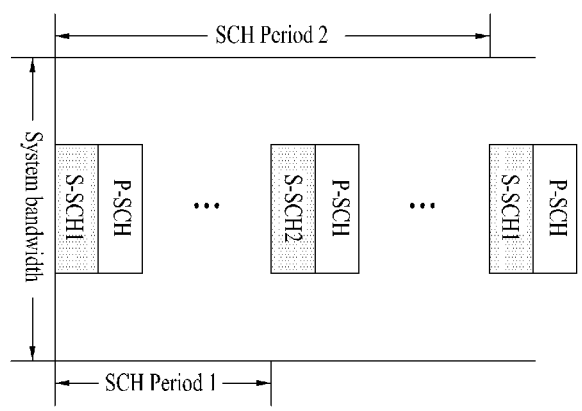
FIG. 1 illustrates an example of a synchronization channel structure of a 3GPP LTE system.
Figure 2:
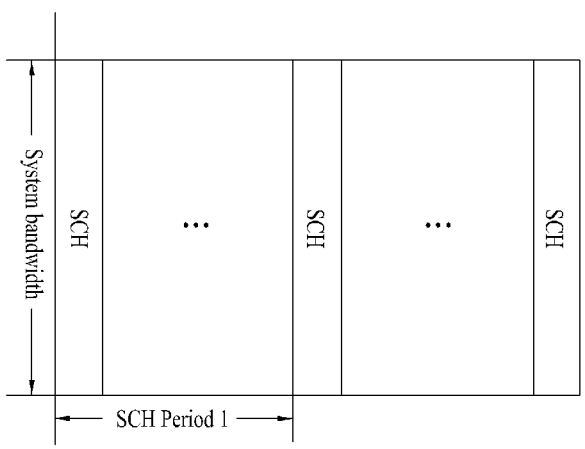
FIG. 2 illustrates an example of a synchronization channel structure of an IEEE 802.16 system.
Figure 3:
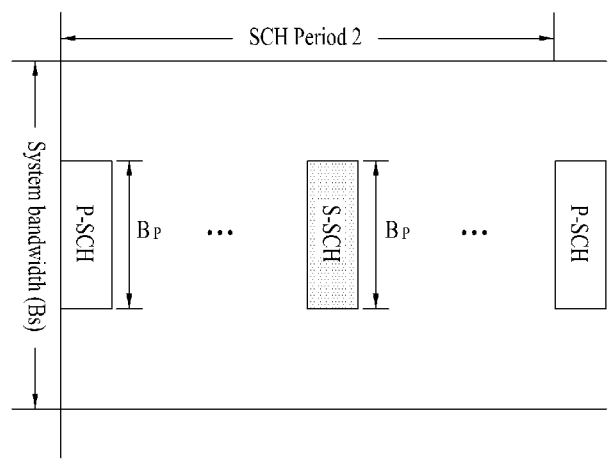
FIG. 3 illustrates a structure of a synchronization channel (SCH) according to an exemplary embodiment of the present invention.

FIG. 3 illustrates a structure of a synchronization channel (SCH) according to an exemplary embodiment of the present invention.

In the structure shown in FIG. 3, a preamble is arranged in a partial region of an entire system bandwidth. The preamble is divided into a primary SCH (P-SCH) and a secondary SCH (S-SCH). As in IEEE 802.16e, the P-SCH and the S-SCH may be defined as being the same.

In FIG. 3, when the P-SCH and the S-SCH are designed as a signal structure of the same sequence, the preamble is arranged in a specific bandwidth rather than the entire system bandwidth and the specific bandwidth has a prescribed size irrespective of the system bandwidth.

If the P-SCH and the S-SCH are discriminated, the P-SCH serves as a signal structure for timing detection and the S-SCH serves as a signal structure for cell ID detection. The P-SCH may be formed as a structure having a repeated pattern in the time domain. The S-SCH desirably includes many cell IDs.

Figure 4:
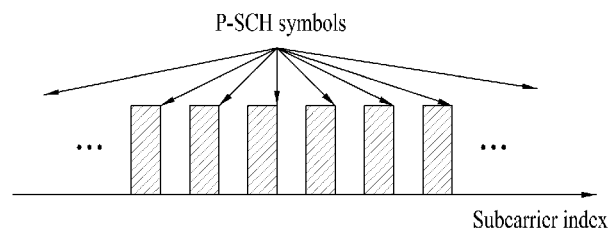
FIG. 4 illustrates a signal structure of a P-SCH in FIG. 3.

FIG. 4 illustrates a signal structure of a P-SCH in FIG. 3.

A sequence or a codeword may be applied to the P-SCH at intervals of two or more subcarriers as illustrated in FIG. 4. Then the P-SCH has a repeated pattern.

Figure 5:
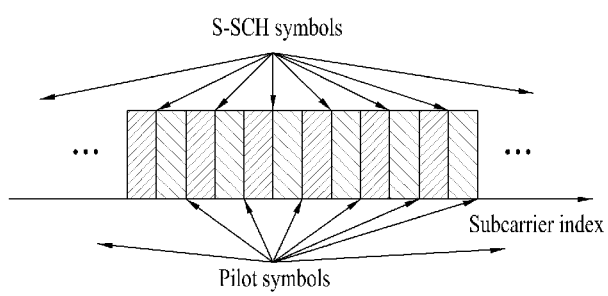
FIG. 5 illustrates a signal structure of a S-SCH in FIG. 3.

FIG. 5 illustrates a signal structure of a S-SCH in FIG. 3.

If a S-SCH and a P-SCH have a substantial time difference, channel estimation cannot be applied from the P-SCH. Therefore, the S-SCH desirably has the same interval as the P-SCH, that is, the interval of two subcarriers. Pilot signals for channel estimation may be applied to the other subcarrier regions. However, if the S-SCH and the P-SCH have a small time difference, that is, if the S-SCH is adjacent to the P-SCH, since channel estimation is difficult due to dependency on the P-SCH, the S-SCH may generate signals using all available subcarriers.

Figure 6:
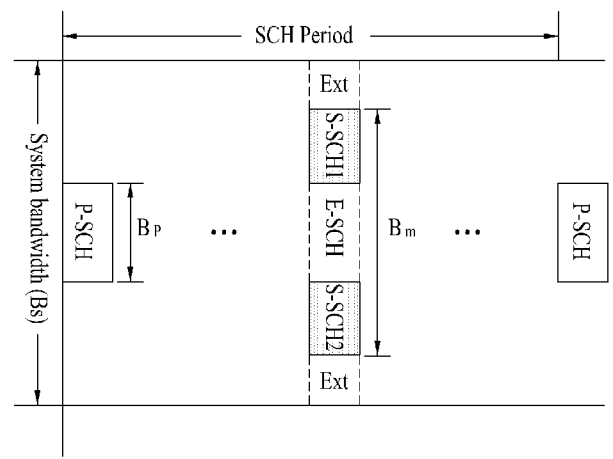
FIG. 6 illustrates a structure of a SCH according to another exemplary embodiment of the present invention.

FIG. 6 illustrates a structure of a SCH according to another exemplary embodiment of the present invention.

When a preamble signal is generated as illustrated in FIG. 3, since the preamble signal is transmitted only through a determined minimum bandwidth, it is disadvantageous for location calculation. The exemplary embodiment shown in FIG. 6 has a format which can allocate much power to each SCH by dividing the SCH into a S-SCH and a P-SCH.

In FIG. 6, the P-SCH occupies only a predetermined bandwidth Bp. The S-SCH occupies a bandwidth having the same as or a different size from the bandwidth Bp, which for example includes at least a partial bandwidth except for the predetermined bandwidth Bp out of the entire system bandwidth. In this case, the S-SCH may occupy a partial bandwidth Bm-Bp or an entire bandwidth Bs-Bp out of a bandwidth which is not used by the P-SCH. Namely, when a system bandwidth is Bs Hz, a bandwidth used by the P-SCH is Bp Hz, and a minimum bandwidth supported by an air interface is Bm Hz, a region which can be occupied by the S-SCH is (Bm-Bp) to (Bs-Bp) Hz. Signal structures of the P-SCH and S-SCH may be similar to the signal structure shown in FIG. 4. The S-SCH is divided into a S-SCH1 and a S-SCH2 which may include different information. Namely, a cell ID may be expressed by a combination of information contained in the S-SCH1 and S-SCH2. If it is sufficient to express a cell ID though the S-SCH1 and S-SCH2, the S-SCH1 and the S-SCH2 may be forms applying simple repetition of the SCH or forms omitting one of the two SCHs. When repetition is applied to the S-SCH1 and S-SCH2, if both the S-SCH1 and the S-SCH2 are transmitted, frequency diversity of a channel can be improved.

Figure 7:
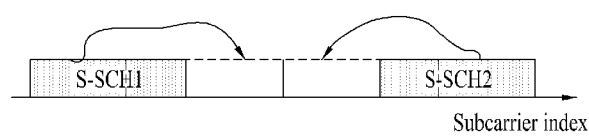
FIG. 7 illustrates an example of applying cyclic copy to an extended SCH.

FIG. 7 illustrates an example of applying cyclic copy to an extended SCH.

An extended SCH (E-SCH) may be additionally defined. The E-SCH has the same bandwidth as the P-SCH. Information of a S-SCH may be extended to the E-SCH and then transmitted.

Repetition or cyclic copy may be applied to the E-SCH. If the E-SCH is sufficiently smaller in size than the S-SCH, uniform cyclic copy from a S-SCH1 and a S-SCH2 is applied to the E-SCH. If the E-SCH is larger than the S-SCH, the S-SCH is repeatedly included in the E-SCH and cyclic copy is applied to the remaining region.

The E-SCH may be a form masked by, for example, Walsh, discrete Fourier transform (DFT) vector, etc.

The P-SCH may additionally be transmitted through the E-SCH. Latency for obtaining timing of a downlink signal can be reduced by retransmitting the P-SCH. Further, the accuracy of location can be increased by further transmitting a signal to an E-SCH region. To obtain higher accuracy, information of the S-SCH may be extended to be included in an extended region Ext. In this case, a masking version, such as cyclic copy, Walsh extension of the S-SCH, or DFT vector extension, may be applied.

Figure 8:
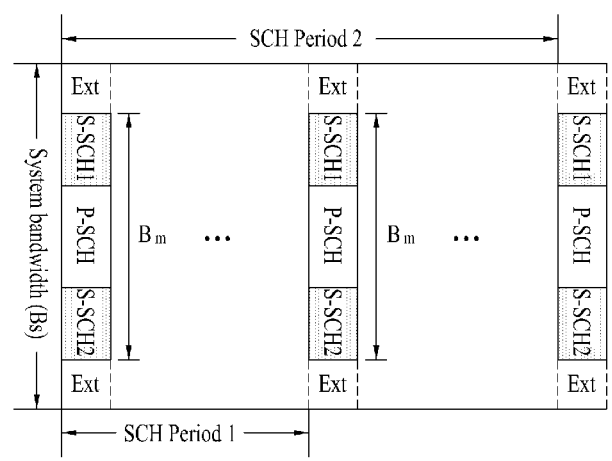
FIG. 8 illustrates a structure of a SCH according to a further exemplary embodiment of the present invention.

FIG. 8 illustrates a structure of a SCH according to a further exemplary embodiment of the present invention.

The exemplary embodiment of FIG. 8 is more compact than the exemplary embodiment of FIG. 6. In more detail, a P-SCH and a S-SCH are transmitted at the same time on the same OFDM symbol. In this case, the total amount of power applied to each SCH may be discriminated.

The P-SCH and the S-SCH may use similar structures to the structures of FIG. 4 and FIG. 5. Information of a S-SCH1 and a S-SCH2 may be the same. A mobile station can determine timing of a downlink signal using a minimum time and can immediately detect a cell ID at a corresponding location. The accuracy of location measurement can be raised by using the P-SCH and the S-SCH simultaneously, extending the S-SCH up to a system bandwidth, or applying an additional sequence.

Figure 9:
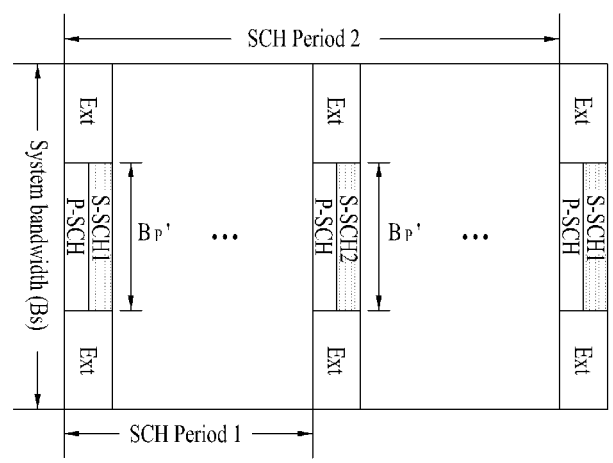
FIG. 9 illustrates a structure of a SCH according to another exemplary embodiment of the present invention.

FIG. 9 illustrates a structure of a SCH according to another exemplary embodiment of the present invention.

In an OFDM structure defined in IEEE 802.16e, symbols have the same length. FIG. 9 shows an example of using preamble OFDM symbols divided into halves, when symbols of the same length are used. The P-SCH may precede the S-SCH as shown in FIG. 9 or may follow the S-SCH. Such an approach does not damage a conventional structure while generating a multi-step preamble structure. In respective SCHs, subcarrier spacing is increased and different fast Fourier transform (FFT) sizes may be used. Accordingly, the total number of subcarriers is defined to an exponent of 2 and an OFDM symbol length corresponding thereto is designed. If a system uses an FFT size of 1024, when OFDM symbols are divided into halves, the respective symbols may use FFT of 512 or 256. In FIG. 9, for location measurement, a signal related to a cell ID can be transmitted using a sequence or codeword through a region except for a bandwidth used for a preamble.

A sequence used for the preamble requires a structure suitable for search and the amount of information.

A P-SCH sequence is as follows. To search a P-SCH signal, a mobile station obtains code correlation using a sequence or obtains auto-correlation using a repeated pattern included in the P-SCH. During this process, complexity depends on how accurately sampling of a received signal is performed and on the number of constellations of the P-SCH. If the constellation of the P-SCH sequence is simply a binary form such as 1 or −1, a receiving end can implement hardware necessary for search using the sequence simply by addition and subtraction. Therefore, the P-SCH sequence may be generated using sequences in which constellation is limited to binary or minimum quadrature phase-shift keying (QPSK) among constant amplitude zero auto-correlation (CAZAC) or generalized chirp-like (GCL) sequences. Alternatively, Hadamard sequences or m-sequences may be used but cubic metric is reduced compared with CAZAC series. Since a large number of sequences is not necessary for timing search, only a few sequences which are the most suitable for search may be used. If the sequences are in a conjugate relation with each other, or if a part of sequences are a conjugate, XOR, or masking relation with a part of other sequences, the receiving end can detect the related sequences altogether.

A structure of a S-SCH sequence is as follows. A structure in which search is easy or a cell ID can be immediately detected is suitable for a S-SCH signal. The former corresponds to the case where a cell ID value is directly transmitted. The cell ID is encoded through channel encoding and then transmitted. In this case, since a codeword per cell ID should be decoded, a mapping method of each codeword or an interleaver structure used for the codeword may be changed in preparation for a cell edge in which overlapping S-SCH signals are received. To this end, sequences used for the P-SCH may be employed as the most basic seed value. Namely, according to a sequence value used for the P-SCH, an interleaver used in the codeword of the S-SCH is changed or a method mapped to a subcarrier may be changed. When a sequence ID is transmitted instead of direct transmission of the cell ID, sequences used for the S-SCH may employ Hadamard sequences, m-sequences, Golay sequences, etc. that can be confirmed by simple conversion. In this case, a mobile station can perform simple conversion for sequence search. Meanwhile, when using CAZAC sequences, a sequence ID can be detected through a simple differential operation. Thus when the sequence or codeword is used for the S-SCH, there are various structures in which S-SCH1 and S-SCH2 are transmitted.

FIGS. 10 to 13 illustrate examples of a mapping method when two sequences or two codewords are used for a S-SCH.

Sequences or codewords transmitted to one S-SCH region may be only one sequence or one codeword or combinations of one or more sequences or codewords. That is, a cell ID may be expressed by a combination of multiple sequence IDs or a combination of codewords.

Figure 10:
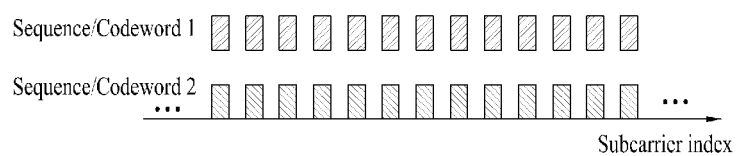
FIGS. 10 to 13 illustrate examples of a mapping method when two sequences or two codewords are used for a S-SCH.
Figure 11:
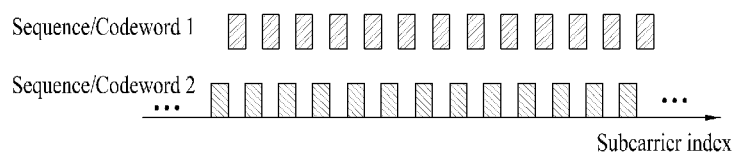
Figure 12:
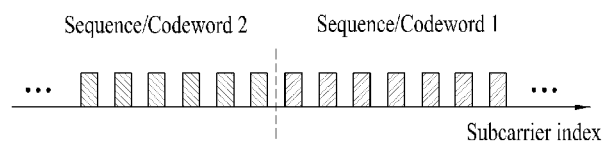
Figure 13:
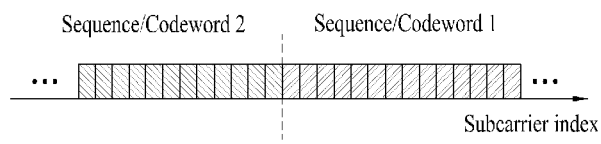

FIG. 10 shows a structure overlapping two sequences or codewords on the same subcarrier together with a pilot subcarrier. FIG. 11 shows a structure applying interfacing to two sequences or codewords without pilot subcarriers. FIG. 12 shows a structure concatenating two sequences or codewords together with pilot subcarriers. FIG. 13 shows a structure concatenating two sequences or codewords without pilot subcarrier.

A structure of an extended sequence is as follows. Since the extended sequence may be used for location measurement, the sequence and a cell ID need to be mapped one to one because a signal delay can be accurately estimated using a combination of a preamble corresponding to the cell ID and the extended sequence by the one-to-one mapping.

Accordingly, when the same type of sequences as the P-SCH or S-SCH is used as the extended sequence, a sequence indicating a cell ID may be re-used. The extended sequence may use the sequence indicating the cell ID or may use a function relation one-to-one corresponding to a cell ID sequence in order to avoid repetition of a sequence. The function relation may consider a function adding offset to the cell ID and a reverse mapping function for mapping the maximum number of IDs to cell IDs.

If an extended region is not sufficient, the cell ID sequence may be extended in the form of cyclic copy. If the extended region is sufficiently wide, the cell ID sequence may be extended by cyclic copy, or the cell ID sequence may be cyclically copied and a sequence one-to-one corresponding to a region accommodating an entire sequence may be added.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

The present invention provides a preamble transmission method which can easily search a preamble of a mobile station by designing the preamble considering a scalable bandwidth and can extend a reference signal for location measurement. The preamble transmission method may be applied to devices such as a base station and a mobile station in 3GPP LTE, IEEE 802.16e, and IEEE 802.16m systems.

What is claimed is:

1. A method for transmitting a preamble to a mobile station using a synchronization channel comprising a primary synchronization channel for timing detection and a secondary synchronization channel for cell ID detection, the method comprising:
    allocating symbols to the primary synchronization channel at intervals of two or more subcarriers;
    transmitting the primary synchronization channel via a first bandwidth out of an entire system bandwidth at a start time point of a synchronization period;
    transmitting the secondary synchronization channel via a second bandwidth at a time point that has a predetermined time difference from the start time point within the synchronization period; and
    transmitting an extended synchronization channel via the first bandwidth,
    wherein a cyclic copy of the secondary synchronization channel is applied to the extended synchronization channel, and
    wherein the second bandwidth is different in size and location from the first bandwidth.

2. The method according to claim 1, wherein the second bandwidth is a bandwidth other than the first bandwidth out of the entire system bandwidth.

3. The method according to claim 1, wherein the second bandwidth is a portion of a bandwidth other than the first bandwidth out of the entire system bandwidth.

4. The method according to claim 1, wherein transmitting the extended synchronization channel comprises repeatedly transmitting the secondary synchronization channel via the extended synchronization channel if the extended synchronization channel is larger than the secondary synchronization channel.

5. The method according to claim 1, further comprising allocating symbols to the secondary synchronization channel at intervals of two or more subcarriers.

6. The method according to claim 5, further comprising arranging pilot symbols between the symbols allocated to the secondary synchronization channel.

7. The method according to claim 1, wherein the predetermined time difference is a time interval corresponding to ¼, ½ or ¾ of the synchronization period.

* * * * *